A. J. SCHULTZ.
MOUNTING NAPS, CAPS, AND THE LIKE UPON HOLLOW ELEMENTS.
APPLICATION FILED JAN. 8, 1918.

1,290,670.

Patented Jan. 7, 1919.

WITNESSES:
Fredk. H. W. Fraentzel
Eva E. Resch.

INVENTOR:
Abraham J. Schultz,
BY Fraentzel and Richards,
ATTORNEYS.

UNITED STATES PATENT OFFICE.

ABRAHAM J. SCHULTZ, OF NEWARK, NEW JERSEY.

MOUNTING NAPS, CAPS, AND THE LIKE UPON HOLLOW ELEMENTS.

1,290,670. Specification of Letters Patent. Patented Jan. 7, 1919.

Application filed January 8, 1918. Serial No. 210,902.

*To all whom it may concern:*

Be it known that I, ABRAHAM J. SCHULTZ, a citizen of the United States, residing at Newark, in the county of Essex and State of New Jersey, have invented certain new and useful Improvements in Mounting Naps, Caps, and the like upon Hollow Elements; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in the attachment of naps, caps, top-mounts, or knobs to ends of hollow or tubular bed-posts, curtain-rods, and the like; and, the present invention has reference, more particularly, to a novel means and method of securing naps, caps, top-mounts, knobs, or the like, upon the ends of hollow or tubular elements, such as bed-posts, curtain or portière-rods, or the like, with a view of providing a self-locking nap, cap, top-mount, or knob, which is simply pushed into position over the end of the hollow or tubular element, and retained in a positively fixed and non-detachable relation to the end of the said hollow or tubular element.

The invention, therefore, has for its principal object to positively unite by means of a self-locking means ornamental naps, caps, top-mounts, knobs, or the like, over the ends of hollow or tubular elements, such as metal bed-posts, curtain poles and other rods, in a most efficient and simple manner, without the use of the usual pin-screws, or rivets, or without soldering, at the same time providing a method by means of which the various elements mentioned are readily and quickly united, at a considerable reduction in the cost of manufacture, and in a most effective manner.

In the practice of mounting naps, caps, top-mounts, knobs, or the like over the ends of hollow or tubular posts, poles, or rods, as at present, the sheet-metal naps, caps, top-mounts, knobs, or the like, are slipped over the ends of such posts, poles, or rods, and are then secured in place by means of pin-screws, which, it has been found in practice, soon work loose, and often are lost, thus leaving the closing ornament in an unsecure position upon the end of the post, pole or rod, with the possibility of the loose ornament working off and also becoming lost. In some instances the said end ornaments are riveted or soldered to the ends of the posts, poles, or rods, but this entails a tedious operation, with considerable cost in the manufacture, all of which is desirable to avoid; and, the invention has for its further object to provide a self-locking nap, cap, top-mount, knob, or the like, which by being secured over the end of the hollow or tubular post, pole, or rod in the manner hereinafter more fully set forth, overcomes the objectionable features mentioned in the above.

Other objects of the present invention not hereinbefore enumerated will be clearly understood from the following detailed description of the same.

With the various objects of the present invention in view, the said invention consists, primarily, in the novel nap, cap, top-mount or the like for hollow or tubular posts, poles or rods, hereinafter set forth; and, the present invention consists, furthermore, in the novel means and method of uniting the nap, cap, top-mount, knob, or the like in its fixed position upon the end of a hollow or tubular bed-post, curtain-pole, rod, or the like, and in the novel arrangements and combinations of the various devices and parts, as well as in the details of the construction of the said parts, all of which will be more fully described in the following specification, and then finally embodied in the clauses of the claim which are appended to and which form an essential part of the said specification.

The invention is clearly illustrated in the accompanying drawings, in which:—

Figure 1 represents in elevation a fragmentary portion of a rectangular hollow metal bed-post and an ornamental nap or cap mounted and secured thereon. according to the principles of the present invention; Fig. 2 is a vertical sectional representation of the said fragmentary portion of metal bed-post and the nap or cap mounted thereon, said view illustrating more particularly the novel means and method of permanently securing said nap or cap upon said post; and Fig. 3 is a horizontal section of the same, said section being taken on line 3—3 in said Fig. 2, looking in the direction of the arrow $x$, Fig. 4 is a vertical sectional representation, similar to said Fig. 2, of a fragmentary portion of a hollow metal bed-post and a cast-metal nap or cap, provided with a modified form of affixing or securing means, the nap or cap being shown about to be slipped and secured in its fixed position about the end of the metal bed-post.

Similar characters of reference are employed in the said above described views, to indicate corresponding parts.

Figure 1:
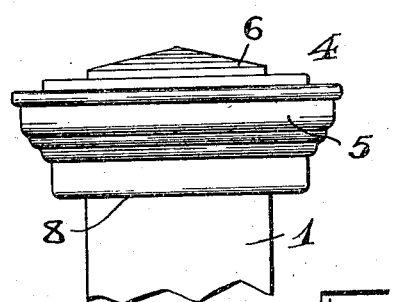
Figure 2:
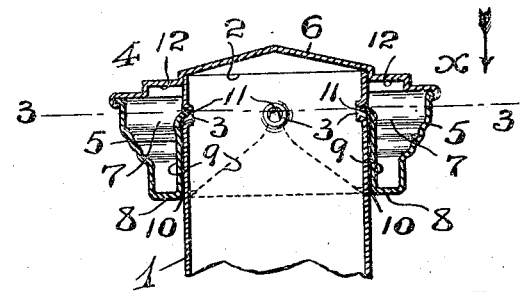
Figure 3:
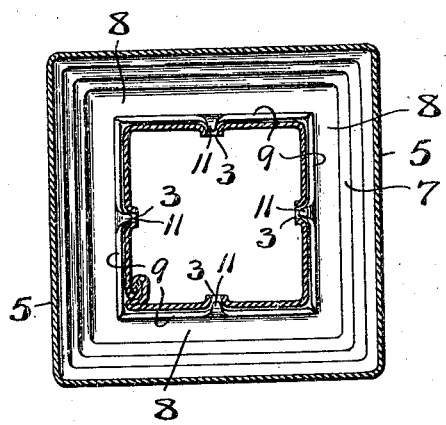

Referring now especially to Figs. 1, 2 and 3 of the drawings, the reference-character 1 indicates the end-portion of a rectangular hollow metal bed-post, or the like, the same being provided in its four sides, suitably disposed from the marginal edge 2 thereof, with suitably disposed holes or perforations 3. The nap or cap, which may be of any suitable ornamentation, and is made from sheet-metal, is indicated by the reference-character 4, and the same comprises a main member 5 and an ornamental top, as 6, suitably connected therewith, to provide a chamber 7. The reference-character 8 indicates a surrounding base-portion, extending inwardly from the lower edge-portion of the said main member 5, and integrally connected with the several base-portions 8 are upwardly extending clamping or holding elements 9, of triangular or other suitable configuration, the said clamping or holding elements being located at the marginal portions surrounding the opening 10 and terminating at their upper ends, within the chamber in slightly inwardly extending retaining fingers or holding tongues, as 11. In order to positively secure the said nap, cap, top-mount, or the like upon the upper end-portion of the said bed-post, or other hollow member, the end-portion 2 is inserted in the correspondingly formed opening 10 of the main member 5, and between the several upwardly extending clamping or holding elements 9, until the respective holes or perforations 3 are brought opposite to and in registration with the respective retaining fingers or holding tongues 11 of the elements 9, the spring-like action of the said elements 9, as will be evident, causing the said fingers or tongues 11 to spring into the said holes or perforations 3, whereby the parts will be positively locked in their assembled relation against separation. Furthermore, the distances of the said holes or perforations 3 from the marginal edge-portions 2 of the post or hollow element 1 are such that said marginal edges 2 will bear firmly upon the inner surface-portions 12 of the top or dome 6 of the ornamental nap, cap, top-mount, or the like, as shown in Fig. 2 of the drawings, so that thereby the said nap, cap, top-mount or the like, when fixed in its locked position, is maintained in such position against movement upon the end of the post, to prevent wabble or rattle of the assembled parts.

While in Figs. 1, 2 and 3 of the drawings, the post-like element 1 and the nap, cap, or top-mount are shown of a square or four-sided cross-section, it will be clearly understood that these elements may be of any other desired and suitable polygonal cross-section, the holes or perforations 3 and the holding or clamping members 9 being varied accordingly.

Figure 4:
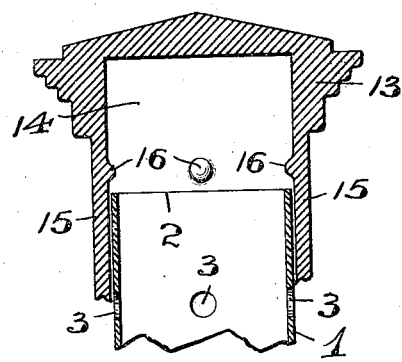

In Fig. 4 of the drawings, I have shown the post-like element with a cast-metal nap, cap or top-mount, indicated by the reference-character 13. In this case, the hollow or chambered portion 14 of said nap, cap, or top-mount, has extending inwardly from the walls 15 suitably disposed projections or teats, as 16, adapted to be forced into the holes or perforations 3 of the post-like member or element, so as to secure the said parts in their positively assembled relation against accidental separation, without the use of pin-screws or solder, as will be clearly evident.

Figure 5:
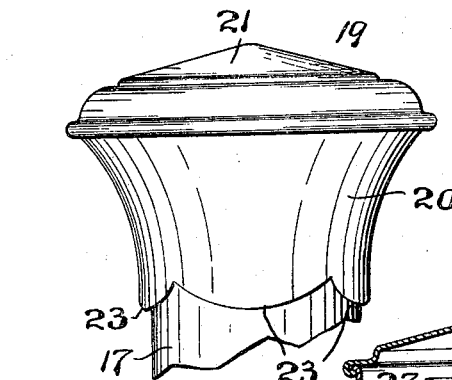
Fig. 5 represents in elevation a fragmentary portion of a cylindrical hollow post, rod, or the like and an ornamental nap or cap mounted and secured thereon according to the principles of the present invention.
Figure 6:
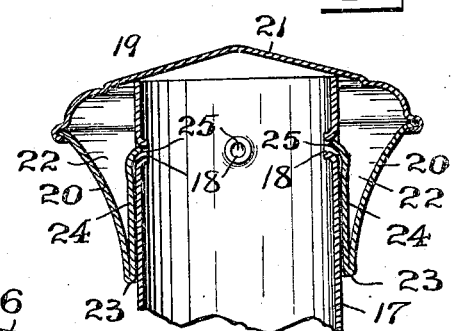
Fig. 6 is a transverse vertical section of the same.

In Figs. 5 and 6 of the drawings is shown an assemblage of a tube-like post or element, as 17, provided with suitably disposed holes or perforations 18, the reference-character 19 indicating a suitably shaped ornamental nap or cap therefor, the latter comprising a cylindrically formed main member 20 provided with an ornamental top or dome 21 suitably connected therewith, to provide a chamber 22. Extending upwardly and inwardly from the lower marginal edge-portion 23 of the said member 20, and integrally connected therewith, are clamping or holding elements 24 which terminate at their upper ends, within the chamber 22 in slightly inwardly extending retaining fingers or holding tongues, as 25. The nap or cap, of the construction just described, is mounted upon the end of the tubular post 17, in the manner of the construction set forth in Figs. 1, 2 and 3 of the drawings, by slipping said nap or cap down over the end of the tube, until the retaining fingers or holding tongues 25 register with the holes or perforations 18, and spring into the said holes or perforations sufficiently so as to maintain a positively locked engagement of the nap or cap with the said tubular post or element 17.

Figure 7:
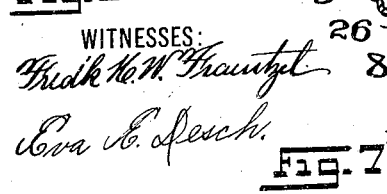
Fig. 7 is a vertical sectional representation of a portion of a rectangular hollow post or rod and a nap or cap therefor provided with another modified form of securing means, the nap or cap in this view being also shown about to be slipped and secured in its fixed position about the end of the post or rod.

In Fig. 7 of the drawings, I have represented an assembled arrangement of ornamental nap or cap, similar to that illustrated in Fig. 2 of the drawings, except that in lieu of the triangular clamping or holding elements 9 shown in said construction, the base-portion 8 of the main body 5 of the nap or cap has an upwardly and inwardly extending tubular portion, as 26, slightly marginally curved or inwardly bent, as as 27, said tubular portion 26 being provided with pressed-out projections or teats, as 28, which are adapted to register with and brought into holding or locked engagement with the holes or perforations 3 in the post or tube-like element 1, as will be clearly understood from an inspection of said Fig. 7 of the drawings.

From the foregoing description of my present invention, and from an inspection of said Fig. 2 of the drawings, it will be clearly seen, that the various parts are easily and quickly brought into their assembled and positively united relation, without the use of pin-screws, rivets, or solder, as heretofore, so that thereby the parts are more quickly united, and the cost of the manufacture greatly reduced, because the uncertain operation of inserting a clenching or riveting tool within the assembled tubular or hollow members is clearly avoided.

I am aware, therefore, that some changes may be made in the arrangements and combinations of the various devices and parts, as well as in the details of the construction of the same, without departing from the scope of the present invention as described in the said specification, and as defined in the clauses of the claim which are appended to the said specification. Hence, I do not limit my present invention to the exact arrangements and combinations of the various devices and parts as described in the said specification, nor do I confine myself to the exact details of the construction of the said parts as illustrated in the accompanying drawings.

I claim:—

1. In combination with a hollow element, as a metal bed-post, rod or pole, provided with perforations, an ornamental nap having a chambered portion adapted to be mounted upon the end of said hollow element, and holding projections connected with said nap and extending from the inner surface thereof into the chambered portion of said nap, said projections being adapted to be forced into holding engagement with the perforations in said hollow element.

2. In combination with a hollow element, as a metal bed-post, rod or pole, provided with perforations, an ornamental nap having a chambered portion adapted to be mounted upon the end of said hollow element, clamping elements connected with said nap, said clamping elements extending upwardly into the chambered portion of the nap, and engaging fingers connected with said clamping elements, said fingers being adapted to be forced into holding engagement with the perforations in said hollow element.

3. In combination with a hollow element, as a metal bed-post, rod or pole, provided with perforations, an ornamental nap comprising a main body and a dome forming a chamber, a marginal base-portion connected with said main body, said base-portion providing an opening for mounting said nap upon the end of said hollow element, marginal clamping elements connected with said base-portion and extending into the chamber of said nap, and engaging fingers connected with said clamping elements, said fingers being adapted to be forced into holding engagement with the perforations in said hollow element.

In testimony, that I claim the invention set forth above I have hereunto set my hand this 2nd day of January, 1918.

ABRAHAM J. SCHULTZ.

Witnesses:
FREDK. C. FRAENTZEL,
FREDK. M. W. FRAENTZEL.